No. 759,790. PATENTED MAY 10, 1904.
W. D. WILLIAMS.
VEHICLE WHEEL.
APPLICATION FILED AUG. 27, 1903. RENEWED APR. 13, 1904.
NO MODEL.
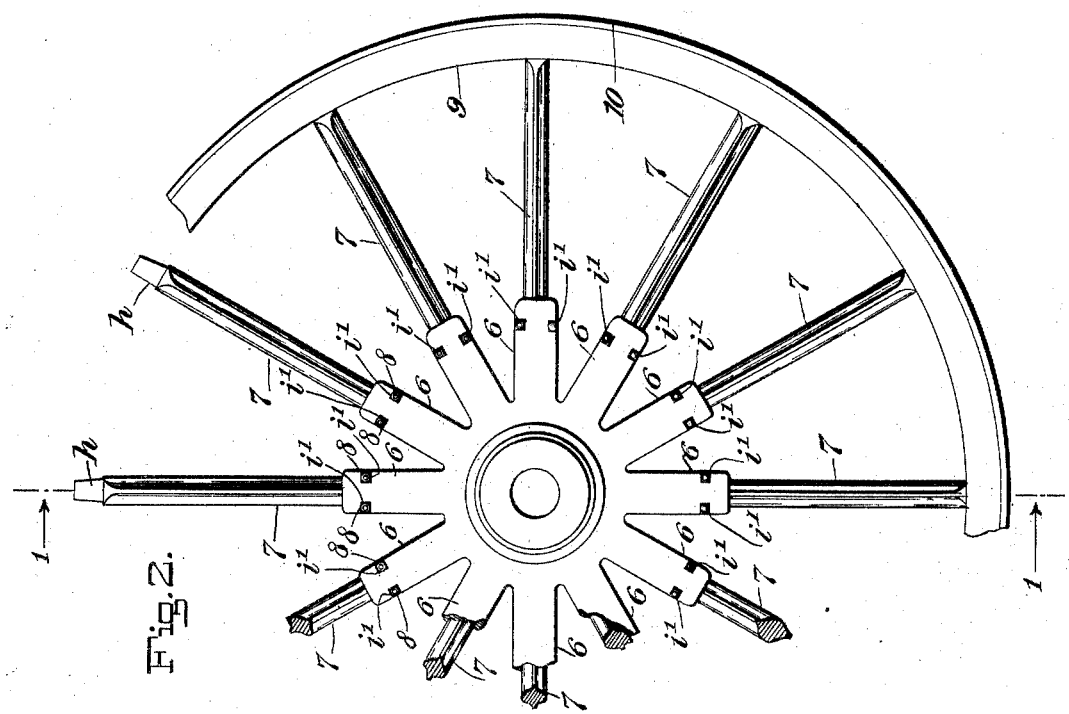
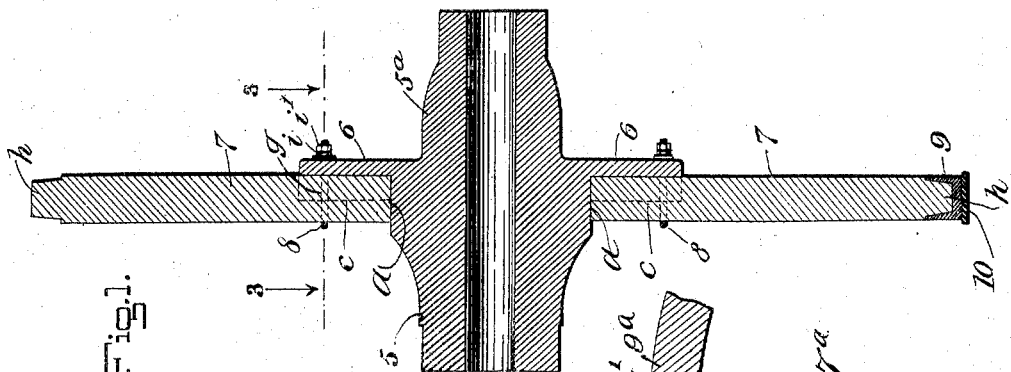
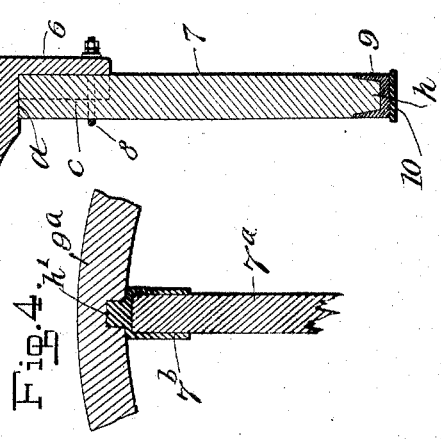
WITNESSES:
Geo. Seguern
Wm. P. Patton
INVENTOR
William D. Williams
BY
ATTORNEYS.

No. 759,790. Patented May 10, 1904.

UNITED STATES PATENT OFFICE.

WILLIAM D. WILLIAMS, OF SALT LAKE CITY, UTAH.

VEHICLE-WHEEL.

SPECIFICATION forming part of Letters Patent No. 759,790, dated May 10, 1904.

Application filed August 27, 1903. Renewed April 13, 1904. Serial No. 203,031. (No model.)

*To all whom it may concern:*

Be it known that I, WILLIAM D. WILLIAMS, a citizen of the United States, and a resident of Salt Lake City, in the county of Salt Lake and State of Utah, have invented a new and Improved Vehicle-Wheel, of which the following is a full, clear, and exact description.

This invention relates to vehicle-wheels of a style in which the spokes are removable from the rim and hub, and has for its object to provide novel details of construction for a vehicle-wheel of the character indicated which afford a neat, strong, and durable wheel and means whereby the spokes of the wheel may be quickly and conveniently removed singly or in any number, as occasion may require, and, furthermore, enable the assembling of all parts of the wheel without heating by the use of a hammer and wrench.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a transverse sectional view taken substantially on the line 1 1 in Fig. 2. Fig. 2 is a side view in part of a vehicle-wheel embodying the invention. Fig. 3 is a transverse sectional view showing novel details substantially on the line 3 3 in Fig. 1, and Fig. 4 is a fragmentary sectional view showing a preferred means for joining the ends of the spokes with a continuous metal felly.

The hub of the improved vehicle-wheel comprises two integral portions 5 $5^a$, having different diameters, the portion $5^a$, which is the smallest, being the outer part of the hub. The hub portions 5 $5^a$ join near the longitudinal center, and the part 5, which is of greatest diameter near its junction with the part $5^a$, is rendered cylindrical, as shown at $a$. A series of radial arms 6 project from the periphery of the hub where the cylindrical wall $d$ merges into the hub portion $5^a$, these evenly-spaced arms having like dimensions. Similar spokes 7, equal in number to the arms 6, are provided, and to accommodate said spokes a longitudinal concaved channel $c'$ is formed in the face of each arm that is to receive a corresponding spoke, the concavity of the channels leaving on each arm two spaced wings $c$, as clearly shown in Fig. 3. The spokes 7 are each furnished with a tenon $h$ on the normal outer end, and said tenons are preferably tapered somewhat toward their extremities, the bodies of the tenons, as usual, being reduced in diameter from that of the ends of the spokes whereon the tenons are formed. The usual oval form in cross-section may be given to the spokes 7, or they may be rendered cylindrical and stiffened with beads, these contours of the spokes being shown in Figs. 2 and 3 of the drawings, it being understood that the channels $c'$, formed in the arms 6, are correspondingly shaped in cross-section, so that the spokes may be properly bedded in the channels, and thus be adapted for a secured connection therewith.

A preferred means for detachably connecting the spokes and arms together in a substantial manner as a completing operation is shown in the drawings, and consists of a looped bolt 8 for each spoke, that is engaged at its loop with the exposed edge portion of the spoke and embraces the sides of the same with its parallel limbs $g$, said limbs extending through parallel perforations formed in a respective arm 6 far enough to receive a nut $i$ and jam-nut $i'$ on each threaded end thereof, as clearly shown in Fig. 3.

A wheel-rim 9 is the completing member of the improved wheel and may be formed either of a single piece of material having circular form or be composed of a plurality of pieces or fellies doweled together at their meeting ends, as is customary in the manufacture of heavy vehicle-wheels. The peripheral surface $a$ of the hub portion 5 having the greatest diameter affords a true seat for the squared inner ends or heels of the spokes 7. The diameter of the wheel-rim 9 is so proportioned to the length of the spokes 7 and tenons $h$ thereon that the heel portions of the spokes will require driving laterally into place on the hub portion 5 after the tenons $h$ on the spokes are properly inserted into respective spaced sockets formed in the inner side of the wheel-rim in the ordinary way.

The looped bolts 8 are not placed in position until the spokes 7 are driven so as to be completely bedded in the channel $c'$ in the arms 6, and previous to the operation of fully driving the spokes home at their lower ends the endless tire 10 is mounted upon the wheel-rim 9. Now as the wheel-rim if practically continuous has a lapped joint at the meeting ends thereof which will permit its diameter to be slightly increased it will be seen that upon successively forcing the spokes 7 into proper engagement with the wheel-rim, the hub, and the arms 6 the resulting expansion of the wheel-rim will bind the tire thereupon, so that it will be firmly "set" in place without requiring its expansion by heat, as is commonly resorted to for the "setting" of the tire on a vehicle-wheel of ordinary construction. When the operation of assembling the parts of the wheel has been so far conducted, the spokes 7 should as a completing operation be clamped upon the arms 6 by means of the U-shaped or looped bolts 8, which, when placed in position as hereinbefore explained and the nuts $i$ $i'$ thereon properly adjusted so as to bind upon the flat surfaces of the arms 6, will complete the improved vehicle-wheel ready for service.

In some cases the wheel-rim $9^a$ may be formed of one continuous piece of metal that is cast into form, and the spokes of the wheel may be of wood. In such a construction it is essential that the outer ends of the spokes which engage with the wheel-rim be protected against wear. To this end it is preferred to incase the outer ends of each of the spokes, such as $7^a$ in Fig. 4, with a metal ferrule $7^b$, that fits neatly thereon and is provided with a tenon $h'$, that fits into a socket in the wheel-rim, as usual. It will be seen that by provision of the ferrules $7^b$ there will be no wear on the dowel ends of the spokes and the wheel will be rendered durable.

Having thus described my invention, I claim as new and desire to secure by Letters Patent—

1. A vehicle-wheel embodying a hub formed in two diameters, defined where they join by a cylindrical wall, a plurality of arms channeled longitudinally in one side and formed radially at the side of the cylindrical wall, spokes having tenons on their outer ends only and seating at their inner ends on the larger-diametered cylindrical wall of the hub, a wheel-rim receiving the tenoned ends of the spokes, and means for clamping the spokes in the channeled sides of the arms.

2. A vehicle-wheel embodying a hub formed in two diameters, defined where they join by a cylindrical wall, a plurality of arms each channeled in one side and radiating from one edge of the cylindrical wall, spokes having tenons on their outer ends only, and seating at their inner ends upon the cylindrical wall of the hub, said spokes being embedded in the channels of the arms, a wheel-rim wherein the tenons of the spokes are socketed, and U-shaped clamping-bolts embracing the spokes and also passing at the sides of the arms, and nuts screwing on the ends of the bolts to bind the spokes upon the arms.

In testimony whereof I have signed my name to this specification in the presence of two subscribing witnesses.

WILLIAM D. WILLIAMS.

Witnesses:
THOS. VAWDREY,
BARNARD J. STEWART.